US009648456B2

(12) United States Patent
Jordan et al.

(10) Patent No.: US 9,648,456 B2
(45) Date of Patent: May 9, 2017

(54) MOBILE ASSET DEVICE TRANSMISSION DETECTION SYSTEM AND METHOD

(71) Applicant: Wi-Tronix, LLC, Bolingbrook, IL (US)

(72) Inventors: Lawrence Jordan, Bolingbrook, IL (US); Michael Heilmann, Bolingbrook, IL (US); Lisa A. Matta, Bolingbrook, IL (US); Michael Schmidt, Bolingbrook, IL (US)

(73) Assignee: Wi-Tronix, LLC, Bolingbrook, IL (US)

( * ) Notice: Subject to any disclaimer, the term of this patent is extended or adjusted under 35 U.S.C. 154(b) by 0 days.

(21) Appl. No.: 14/481,290

(22) Filed: Sep. 9, 2014

(65) Prior Publication Data
US 2015/0072676 A1 Mar. 12, 2015

Related U.S. Application Data

(60) Provisional application No. 61/875,737, filed on Sep. 10, 2013.

(51) Int. Cl.
*H04W 4/00* (2009.01)
*H04W 4/02* (2009.01)
*H04W 4/04* (2009.01)
*G01S 5/00* (2006.01)

(52) U.S. Cl.
CPC .......... *H04W 4/021* (2013.01); *G01S 5/0027* (2013.01); *H04W 4/046* (2013.01); *G01S 2205/002* (2013.01)

(58) Field of Classification Search
CPC ...... H04W 4/021; H04W 4/046; G01S 5/0009

USPC ...................................... 455/426.1
See application file for complete search history.

(56) References Cited

U.S. PATENT DOCUMENTS

| 2002/0177476 | A1 | 11/2002 | Chou | |
|---|---|---|---|---|
| 2009/0275281 | A1* | 11/2009 | Rosen | H04K 3/415 455/1 |
| 2012/0028680 | A1* | 2/2012 | Breed | B60N 2/002 455/556.1 |
| 2013/0238366 | A1 | 9/2013 | Morgan et al. | |
| 2015/0112581 | A1* | 4/2015 | Hakim | G01C 21/3476 701/400 |

* cited by examiner

*Primary Examiner* — Tanmay Shah
(74) *Attorney, Agent, or Firm* — Mercedes V. O'Connor; Rockman Videbeck & O'Connor

(57) ABSTRACT

This invention comprises a mobile asset cellular device transmission detector equipped, a wireless processing unit, an event recorder, and a digital video recorder. The wireless processing unit includes event recorder interface software, digital video recorder interface software that obtains data from the digital video recorder, Wi-Nav software that obtains data from the Wi-Nav, GPS software that obtains data from the GPS and geo-fence software. The cellular device transmission detector continually checks for cellular device transmissions within the mobile asset and if those transmissions were associated with an impact, rollover, operator action or geo-fence defined location or boundary. When a cellular device transmission was made, the wireless processing unit triggers an episode and sends event recorder information, GPS location and speed, audio and video recordings, and impact and rollover information to a back office.

18 Claims, 5 Drawing Sheets

MOBILE ASSET DEVICE TRANSMISSION DETECTION SYSTEM AND METHOD

This application claims priority to provisional application Ser. No. 61/875,737 filed Sep. 10, 2013, to the extent allowed by law.

BACKGROUND OF THE INVENTION

Field of the Invention

The present invention generally relates to equipment used in mobile assets and particularly, to cellular device detection systems used in value mobile assets.

Description of the Prior Art

Mobile assets such as locomotives, mining equipment, cargo, marine and military vehicles and vessels typically employ an onboard data acquisition and logging device, similar to a "black box" on airplanes. A typical onboard data acquisition and logging device, or an event/data recorder, comprises digital and analog inputs as well as pressure switches and transducers which record data from various onboard sensor devices. These event/data recorders log a variety of system parameters used for incident investigation, crew performance evaluation, fuel efficiency analysis, maintenance planning, and predictive diagnostics. Recorded data may include such parameters as speed, distance traveled, location, fuel level, engine revolutions per minute (RPM), fluid levels, operator controls, pressures, and temperature conditions. In addition to the basic event and operational data, video, still image and audio event/data recording capabilities are also deployed on many of these same mobile assets. The data recorded onboard a mobile asset, wirelessly transmitted offboard can be triggered, prioritized and filtered based on the detection of cellular device usage.

A primary object of the present invention is to detect a transmitting cellular device in the cab of a mobile asset.

A further object of the present invention is to provide automatic collision detection during or within a configurable period of time after detection of a transmitting cellular device.

A further object of the present invention is to provide roll-over detection during or within a configurable period of time after detection of a transmitting cellular device.

A further object of the present invention is to provide audio and video recordings using onboard recording systems with one or multiple video and audio capture devices that monitor forward facing, rear facing and in-cab regions.

A further object of the present invention is to provide audio, still image and/or video recordings using onboard recording systems with one or multiple video and audio capture devices that monitor forward facing, rear racing and in-cab regions of a mobile asset nearby or adjacent to the mobile asset within which a transmitting cellular device was detected.

A further object of the present invention is to provide audio and video recordings using recording systems with one or multiple video, still image and audio capture devices with recording equipment from a fixed site nearby or adjacent to the mobile asset within which a transmitting cellular device was detected.

A further object of the present invention is to provide GPS location data to precisely locate the mobile asset at any time, including at a time of transmitting cellular device detection.

A further object of the present invention is to provide user-defined geo-fence geographical locations, regions, or boundaries where cellular device detection is disabled, enabled, or otherwise controlled.

A further object of the present invention is to provide user-defined rule sets where cellular device detection is disabled, enabled, or otherwise controlled. These rule sets may be based on regulatory, statutory, government, business, operational or safety requirements.

A further object of the present invention is to provide user-defined rule sets used in conjunction with user-defined geo-fences where cellular device detection is disabled, enabled, or otherwise controlled.

A further object of the present invention is use of a directional or omnidirectional receiving antenna within the mobile asset.

SUMMARY OF THE INVENTION

The mobile asset cellular device detection system and method of an embodiment of the present invention used on locomotives comprises the integration of four components. The components are an event data recorder (ER), similar to a "black box" on airplanes, a locomotive digital video recorder (LDVR), a wireless processing unit (Wi-PU), and a cellular device transmission detector and antenna. The Wi-PU includes two further components, a Wi-Nav and a global positioning system (GPS).

The Wi-PU also includes software that receives ER information, LDVR recordings, Wi-Nav information, GPS information, and geo-fence information. The ER information can include throttle position, brake pressures, wheel speed, emergency brake application, and horn and bell operation. The GPS information can include the mobile asset's location, in latitude and longitude, heading, elevation and speed. The Wi-Nav information can include impact detection and rollover detection. Wi-Nav information can also include accelerometer data for dead reckoning location when GPS data is unavailable.

The cellular device transmission detector, can detect cellular devices that are powered on and transmitting, that includes when a cellular device within the mobile asset is being used to place a phone call, answer a phone call, send a text message, receive a text message, and any other data transmission such as email updates and browsing the internet. The cellular device transmission detector can also detect the operation of a portable cellular based Wi-Fi hotspot device. The user can also set a geo-fence area where cellular device usage is turned off or turned on, if the mobile asset is moving, stopped, or regardless of whether the mobile asset is moving.

BRIEF DESCRIPTION OF THE DRAWINGS

The present invention is further described with reference to the accompanying drawings in which.

DETAILED DESCRIPTION OF THE ILLUSTRATED EMBODIMENTS

Figure 1:
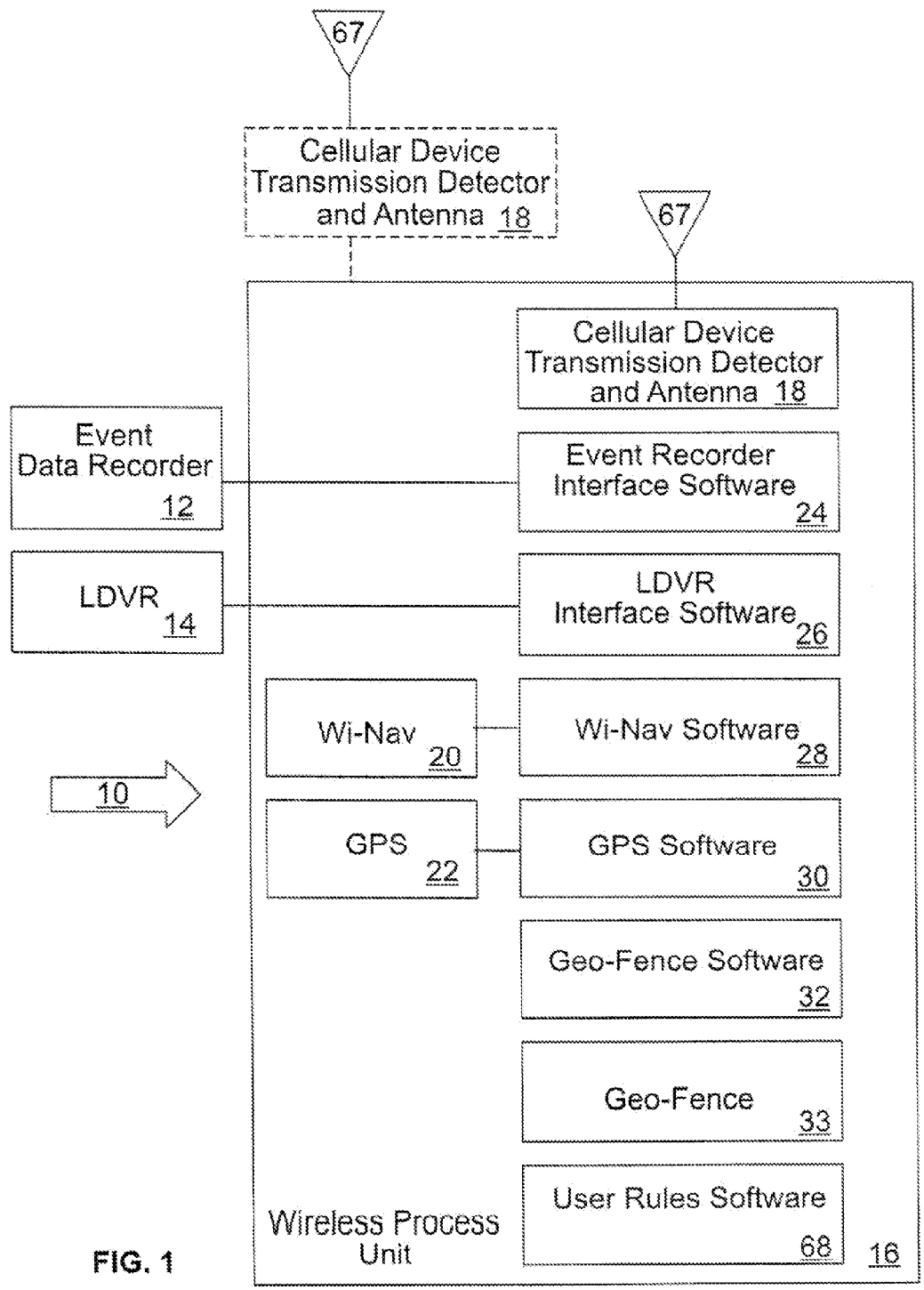
FIG. 1 is a diagram showing the system components of an embodiment of the mobile asset cellular device transmission detector of the present invention.

The mobile asset cellular device transmission detection system and method of the present invention and its components are shown in FIG. 1. The mobile asset cellular device transmission system 10 consists of five interrelated components: an event data recorder (ER) 12, a locomotive digital video recorder (LDVR) 14, a wireless processing unit (Wi-PU) 16, and a cellular device transmission detector and antenna 18. The cellular device transmission detector 18 can be within the Wi-PU 16 or outside of the Wi-PU 16. A Wi-Nav 20 component and a global positioning system (GPS) component 22 are within the Wi-PU 16. The Wi-PU 16 also includes ER 12 interface software 24, LDVR 14 interface software 26, Wi-Nav 20 software 28, GPS 22 software 30, geo-fence software 32 and user rules software 68. Installing the Wi-PU 16 onto an asset, such as a locomotive, consists of mounting the Wi-PU 16 with an external or internal cellular device transmission detector 18, and connecting it externally to an ER 12, an LDVR 14, a directional or omni-directional receiving antenna 67 and any additional available condition sensing devices.

The ER 12, similar to a black-box on airplanes, is an onboard data logging device for locomotives. A typical ER 12 consists of digital and analog inputs as well as pressure switches and pressure transducers which record data from various onboard devices, such as throttle position, brake pressures, emergency brake application, and horn and bell application. The Wi-PU 16 receives and processes data from the ER 12 once per second over an external serial connection.

The LDVR 14, similar to a television DVR, is an onboard audio, still image and/or video recording device. The LDVR 14 comes equipped with a forward facing camera and may also include an in-cab facing camera, a rear facing camera, and microphones. The cameras are mounted at such orientations that they see and record what the engineer sees and the cab environment. The Wi-PU 16 accesses the LDVR 14 via an external Ethernet connection to download the audio, still image and/or video from the hard drive before, during, and after an event, such as when the cellular device transmission detector 18 detects that a cellular device is powered on and transmitting.

The Wi-PU 16 can use the geo-fence software 32 to set a geo-fence 33 that defines a geographic location, region or boundary within which the cellular device transmission detector 18 is to check for transmission or disregard a transmission detection. The geo-fence can be configurable to certain geographic locations 33. The geo-fence 33 can geographically define locations where cellular device detection is disabled, enabled or otherwise controlled.

The Wi-PU 16 can use the user rules software 68 to define specific rules under which the cellular device transmission detector 18 is to check for transmission or disregard a transmission detection. The user rules 68 define regulatory, statutory, government, business, operational or safety requirements where cellular device detection is disabled, enabled or otherwise controlled.

The Wi-PU 16 of the illustrated embodiment is a ruggedized onboard computer running Windows XP or a similar operating system embedded specifically for industrial applications. It has many different features that can be installed to customize the product for specific customer needs. The Wi-PU 16 has the ability to communicate with a wide variety of onboard systems, including, but not limited to, vehicle control systems, event data recorders, LDVRs, cellular device transmission detectors, and engine controllers. The Wi-PU 16 has the ability to communicate over a wide variety of protocols, including, but not limited to, RS 232, RS 422, RS 485, CAN Bus, Ethernet, WiFi, cellular, and satellite.

The cellular device transmission detector 18, as is known in the art, can be an internal or external component of the Wi-PU 16, The cellular device transmission detector 18 detects several frequencies. In North America, the cellular device transmission detector 18 detects 1850-1910 MHz (PCS), 824-849 MHz (CDMA), 896-901 MHz (GSM), and 700 MHz (LTE). The cellular device transmission detector 18 has an adaptive sensitivity and can be optimized for the particular model of locomotive it is to be used on. The cellular device transmission detector 18 can be used with either a directional or omnidirectional receiving antenna 67.

Figure 2:
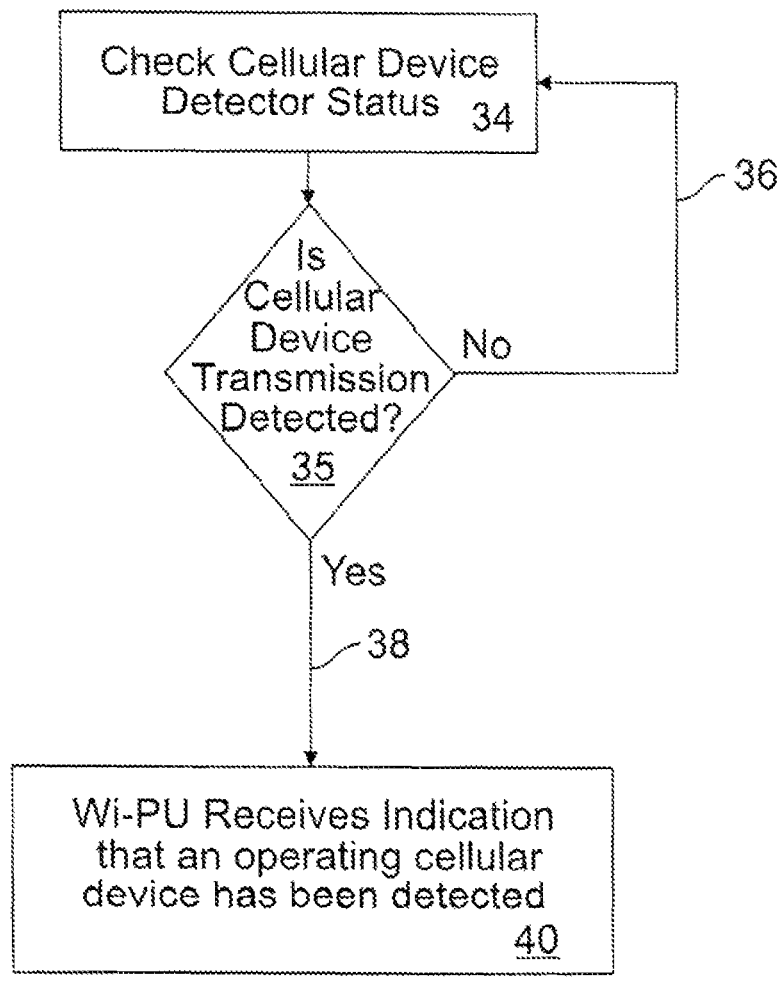
FIG. 2 is a flow diagram showing when a cellular device transmission is detected in the present invention.

FIG. 2 is a flow diagram showing when a cellular device transmission is detected in the present invention. The cellular device transmission detector 18 (FIG. 1) continually checks the cellular device transmission status 34 as received using the in cab antenna 67 (FIG. 1), checking if the cellular device is powered on and/or transmitting a signal 35. If the cellular device is not powered on and/or is not transmitting a signal 36, then the cellular device transmission detector continues to check the status 34. If the cellular device is powered on and/or is transmitting a signal 38, the cellular device transmission detector 18 alerts the Wi-PU 16 of the signal detection 40. The cellular device transmission detector 18 will detect cellular transmissions within the cab of a mobile asset. Transmissions include placing a phone call, answering a phone call, sending a text message, receiving a text message, any data transmission (email updates, browsing the internet, etc.), and the operation of a portable cellular based Wi-Fi hotspot.

Figure 3:
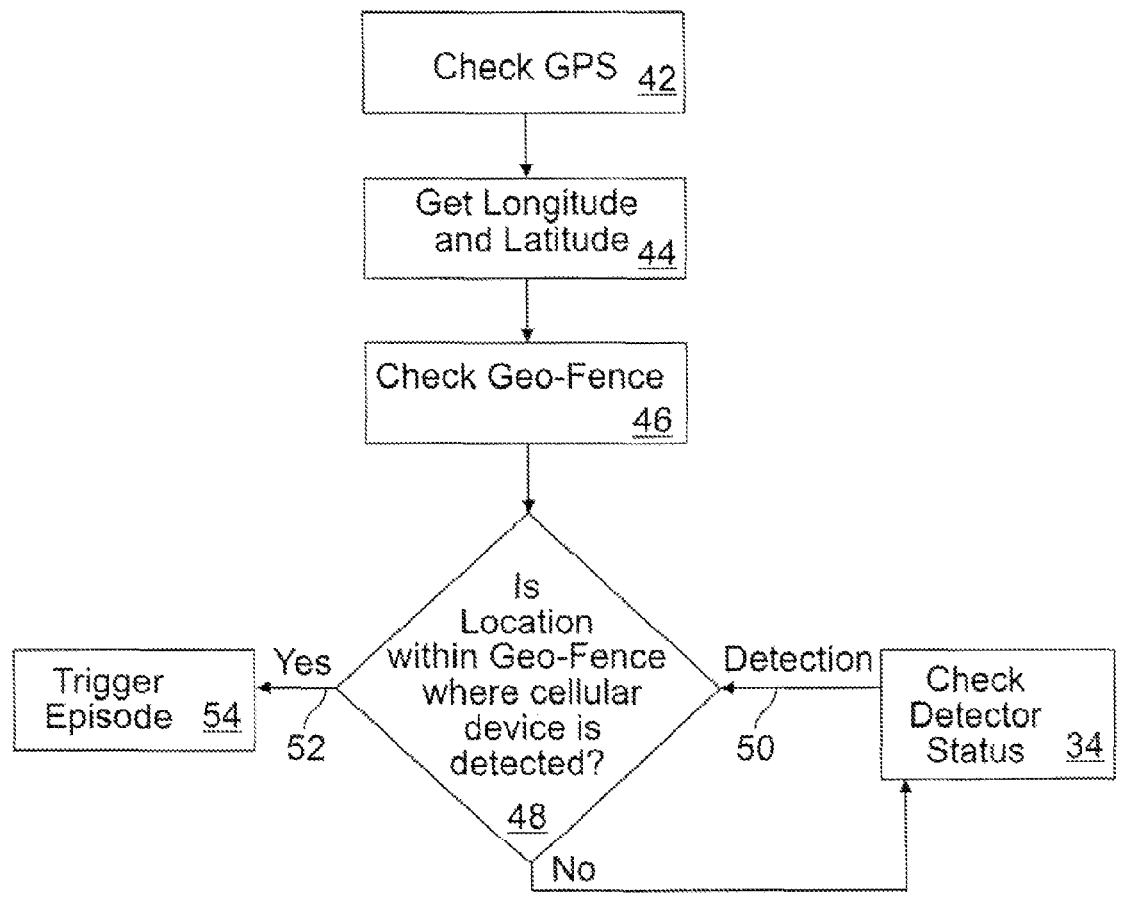
FIG. 3 is a flow diagram showing the wireless processing unit checking the GPS onboard the mobile asset.

FIG. 3 is a flow diagram showing when a cellular device transmission has been detected. Once the Wi-PU 16 (FIG. 1) is alerted that a signal has been detected, the GPS software 30 (FIG. 1) checks the GPS 42 and obtains the mobile asset's location in latitude and longitude 44. If GPS location data is not available, the Wi-PU 16 uses dead reckoning to determine the location in latitude and longitude 44 of the mobile asset. Dead reckoning is the process of calculating current position by using a previously determined position, or fix, and advancing that position based upon known or estimated speeds over elapsed time and course. In dead reckoning mode, the last known latitude and longitude are obtained from the GPS 42 and stored. Using the last known latitude and last known longitude, along with the asset's speed, the wheel speed from the event recorder information, the tilt compensated heading and the data from the 3-axis gyroscope, a new position is calculated. The new latitude and the new longitude positions are stored and used, and the process continues until valid GPS data is again available. When the Wi-PU 16 has latitude and longitude coordinates, the Wi-PU 16 then checks the geo-fence 46 and determines whether the location of the mobile asset is within that geo-fence 46 and whether the cellular device detection is disabled, enabled or otherwise controlled. If the location of the mobile asset is within the geo-fence 46 and cellular device detection 50 is not enabled within that geo-fence 48, the cellular device transmission detector 18 continues to check detector status 34 (FIG. 2). If the location of the mobile asset is within the geo-fence 46 and cellular device detection is enabled 52 or otherwise controlled, the Wi-PU 16 triggers an episode 54.

Figure 4:
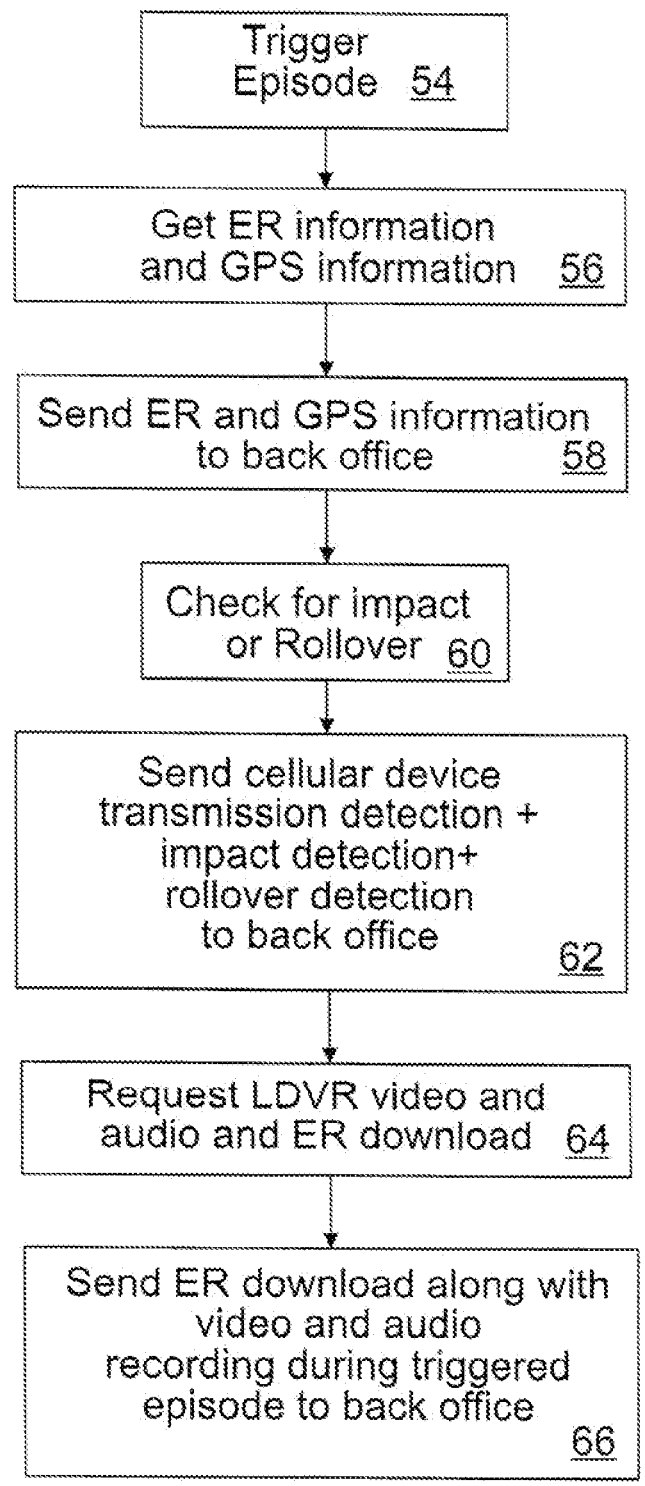
FIG. 4 is a flow diagram showing when a trigger episode has been detected within a geo-fence where cellular device transmission detection is enabled.

FIG. 4 is a flow diagram showing when a trigger episode 54 has been detected. When a trigger episode 54 has been detected, the ER information software 24 (FIG. 1) checks the ER information and the GPS software 30 (FIG. 1) checks the GPS and obtains the mobile asset's location in latitude and longitude, heading and speed 56. The Wi-PU 16 then sends the ER information and the GPS 22 location to the back office 58. The ER information can include throttle position, brake pressure, emergency brake application, horn and bell application. The Wi-PU 16 then checks the Wi-Nav software 28 and determines whether an impact and/or a rollover occurred 60. The Wi-PU will then send the back office information on whether cellular device transmission was detected, cellular device transmission was detected with an impact, and/or cellular device transmission was detected with a rollover 62. The Wi-PU 16 will also check the LDVR software 26 (FIG. 1) to obtain audio, still image and/or video recordings 64 of the trigger episode 54 along with event recorder data download and will send the audio/still image/video recording from the LDVR 14 and the event recorder data download from the event data recorder 12 for the time of the trigger episode 54 to the back office 66.

The back office uses the GPS 22 location information to determine other nearby or adjacent mobile assets and fixed sites equipped with an LDVR 14. The back office requests and receives still image and/or video data from an adjacent mobile asset's Wi-PU 16 or fixed sites with LDVR software 26.

The back office uses the GPS 22 location information to determine other nearby or adjacent mobile assets equipped with an LDVR 14. The back office requests and receives still image and/or video data from an adjacent mobile asset's Wi-PU 16 with LDVR software 26.

The back office uses the GPS 22 location information to determine other nearby or adjacent fixed sites equipped with an LDVR 14. The back office requests and receives still image and/or video data from the fixed site LDVRs 14.

Figure 5:
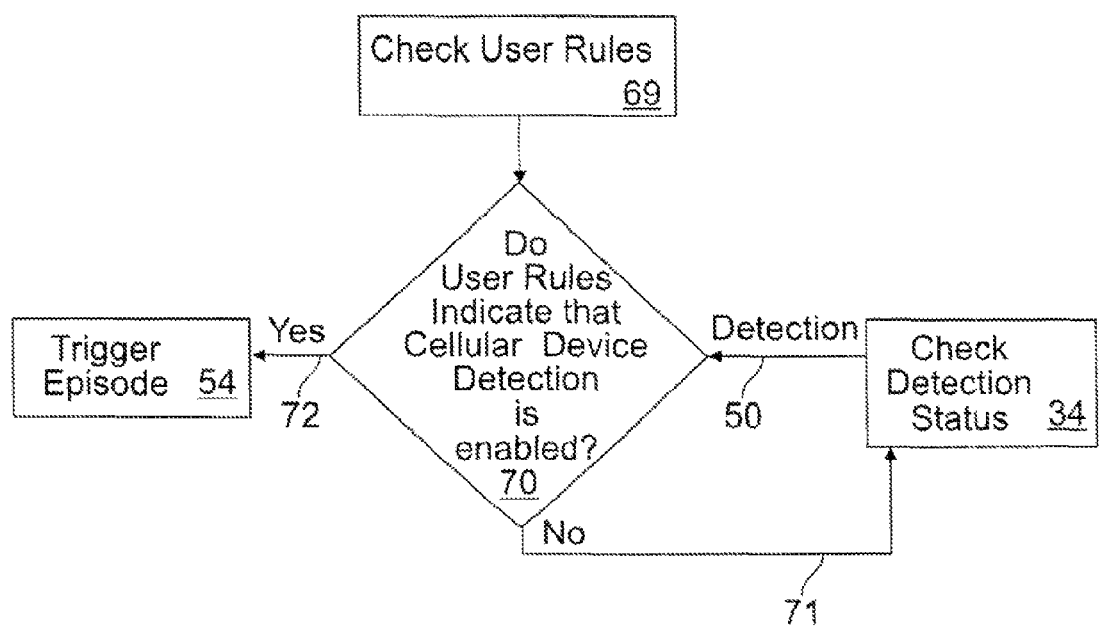
FIG. 5 is a flow diagram showing when a trigger episode has been detected and user defined rules indicate that cellular device transmission detection is enabled.

FIG. 5 is a flow diagram showing when cellular device transmission has been detected. Once the Wi-PU 16 (FIG. 1) is alerted that a signal has been detected, the Wi-PU checks the user defined rules 69 to determine whether the cellular device detection is disabled, enabled or otherwise controlled 70. If the user defined rules indicate that cellular device detection is not enabled 71, the cellular device transmission detector 18 continues to check detector status 34 (FIG. 2). If the user defined rules indicate that cellular device detection is enabled 72 or otherwise controlled, the Wi-PU 16 triggers an episode 54.

The foregoing description of an illustrated embodiment of the invention has been presented for purposes of illustration and description, and is not intended to be exhaustive or to limit the invention to the precise form disclosed. The description was selected to best explain the principles of the invention and practical application of these principles to enable others skilled in the art to best utilize the invention in various embodiments and various modifications as are suited to the particular use contemplated. It is intended that the scope of the invention not be limited by the specification, but be defined by the claims set forth below.

What is claimed is:

1. A method for detecting operation of a cellular device onboard a mobile asset, comprising the steps of:
    a. detecting radio frequency energy, using one of a directional and an omnidirectional receiving antenna, produced by the cellular device onboard the mobile asset;
    b. continually checking a transmission status of the cellular device based on the radio frequency energy, detected by the antenna, using a cellular device transmission detector onboard the mobile asset; and
    c. receiving an operating indication indicative of a first condition of the cellular device, using a wireless processing unit onboard the mobile asset, from the cellular device transmission detector on a second condition that the transmission status indicates that the first condition of the cellular device is operating.

2. The method of claim 1, wherein operating includes at least one of powered on, transmitting a signal, placing a phone call, answering a phone call, sending a text message, receiving a text message, transmitting data, and operating a portable cellular based wi-fi hotspot.

3. The method of claim 1, wherein the transmission status includes at least one of the cellular device is powered on, the cellular device is powered off, the cellular device is transmitting a signal, and the cellular device is receiving a signal.

4. The method of claim 1, further comprising the steps of:
    the wireless processing unit checking a set of user-defined rules; and
    the wireless processing unit triggering an episode at a time when the set of user-defined rules indicate cellular device transmission detection is one of enabled and controlled.

5. A method for detecting operation of a cellular device onboard a mobile asset, comprising the steps of:
    detecting radio frequency energy, using one of a directional and an omnidirectional receiving antenna, produced by the cellular device onboard the mobile asset;
    continually checking a transmission status based on the radio frequency energy, detected by the antenna, using a cellular device transmission detector onboard the mobile asset;
    receiving an operating indication of the cellular device, using a wireless processing unit onboard the mobile asset, from the cellular device transmission detector on a condition that the transmission status indicates that the cellular device is operating;
    a global positioning system software application checking a global positioning system (GPS) within the wireless processing unit onboard the mobile asset;
    determining a location of the mobile asset based on one of GPS data received from the GPS on a condition that GPS data is available from the GPS and dead reckoning on a condition that GPS data is not available from the GPS;
    the wireless processing unit comparing the location to a predetermined geo-fence area; and
    the wireless processing unit triggering an episode at a time when the location is within the predetermined geo-fence area and cellular device transmission detection is one of enabled and controlled within the predetermined geo-fence area.

6. The method of claim 5, wherein the location of the mobile asset includes latitude and longitude coordinates.

7. A method for detecting operation of a cellular device onboard a mobile asset, comprising the steps of:
    detecting radio frequency energy, using one of a directional and an omnidirectional receiving antenna, produced by the cellular device onboard the mobile asset;
    continually checking a transmission status based on the radio frequency energy, detected by the antenna, using a cellular device transmission detector onboard the mobile asset;
    receiving an operating indication, using a wireless processing unit, from the cellular device transmission detector on a condition that the transmission status indicates that the cellular device is operating;

a global positioning system software application checking a global positioning system (GPS) within the wireless processing unit onboard the mobile asset;

determining a location of the mobile asset based on one of GPS data received from the GPS on a condition that GPS data is available from the GPS and dead reckoning on a condition that GPS data is not available from the GPS;

the wireless processing unit comparing the location to a predetermined geo-fence area;

the wireless processing unit triggering an episode at a time when the location is within the predetermined geo-fence area and cellular device transmission detection is one of enabled and controlled within the predetermined geo-fence area;

checking at least one event data recorder onboard the mobile asset, using an event data recorder software application, and obtaining event data recorder information recorded at or near the time of the episode;

the GPS software application obtaining GPS information of the mobile asset;

the wireless processing unit sending the event data recorder information and the GPS information to a back office;

the wireless processing unit detecting at least one of the operating indication, the operating indication and an impact indication involving the mobile asset, and the operating indication and a rollover indication involving the mobile asset;

sending at least one of the operating indication, the operating indication and impact indication, and the operating indication and rollover indication to the back office;

the wireless processing unit requesting at least one of a first audio recording, an first still image recording, and a first video recording recorded at or near the time of the episode from a digital video recorder onboard the mobile asset; and the wireless processing unit sending at least one of the event data recorder information and at least one of the first audio recording, first still image recording, and first video recording to the back office.

8. The method of claim 7, wherein the GPS information includes at least one of the location, a heading, and a speed of the mobile asset.

9. The method of claim 8, wherein the location of the mobile asset includes latitude and longitude coordinates.

10. The method of claim 7, wherein the back office uses the GPS information to locate at least one of an adjacent mobile asset and an adjacent fixed site.

11. The method of claim 10, wherein the back office requests and receives at least one of a second audio recording, a second still image recording, and a second video recording from at least one of the adjacent mobile asset and the adjacent fixed site.

12. The method of claim 7, wherein the event data recorder information includes at least one of throttle position, brake pressure, emergency brake application, and horn and bell application of the mobile asset.

13. A method for detecting operation of a cellular device onboard a mobile asset, comprising the steps of:

detecting radio frequency energy, using one of a directional and an omnidirectional receiving antenna, produced by the cellular device onboard the mobile asset;

continually checking a transmission status based on the radio frequency energy, detected by the antenna, using a cellular device transmission detector onboard the mobile asset;

receiving an operating indication, using a wireless processing unit, from the cellular device transmission detector on a condition that the transmission status indicates that the cellular device is operating;

the wireless processing unit checking a set of user-defined rules;

the wireless processing unit triggering an episode at a time when the set of user-defined rules indicate cellular device transmission detection is one of enabled and controlled;

checking at least one event data recorder onboard the mobile asset, using an event data recorder software application, and obtaining event data recorder information recorded at or near the time of the episode;

a global positioning system software application checking a global positioning system (GPS) within the wireless processing unit and obtaining GPS information of the mobile asset;

the wireless processing unit sending the event data recorder information and the GPS information to a back office;

the wireless processing unit detecting at least one of the operating indication, the operating indication and an impact indication involving the mobile asset, and the operating indication and a rollover indication involving the mobile asset;

sending at least one of the operating indication, the operating indication and impact indication, and the operating indication and rollover indication to the back office;

the wireless processing unit requesting at least one of a first audio recording, a first still image recording, and a first video recording recorded at or near the time of the episode from a digital video recorder onboard the mobile asset; and the wireless processing unit sending at least one of the event data recorder information and at least one of the first audio recording, first still image recording, and first video recording to the back office.

14. The method of claim 13, wherein the GPS information includes at least one of a location, a heading, and a speed of the mobile asset.

15. The method of claim 14, wherein the location of the mobile asset includes latitude and longitude coordinates.

16. The method of claim 13, wherein the back office uses the GPS information to locate at least one of an adjacent mobile asset and an adjacent fixed site.

17. The method of claim 16, wherein the back office requests and receives at least one of a second audio recording, a second still image recording, and a second video recording from at least one of the adjacent mobile asset and the adjacent fixed site.

18. The method of claim 13, wherein the event data recorder information includes at least one of throttle position, brake pressure, emergency brake application, and horn and bell application of the mobile asset.

* * * * *